Dec. 10, 1957  W. B. EDDISON ET AL  2,815,628
SEAL HANDLING HEAD
Filed May 31, 1956  3 Sheets-Sheet 1

INVENTORS.
WILLIAM BARTON EDDISON
WARREN E. ERICKSON
BY
*Andrew & Sealer*
Attorneys

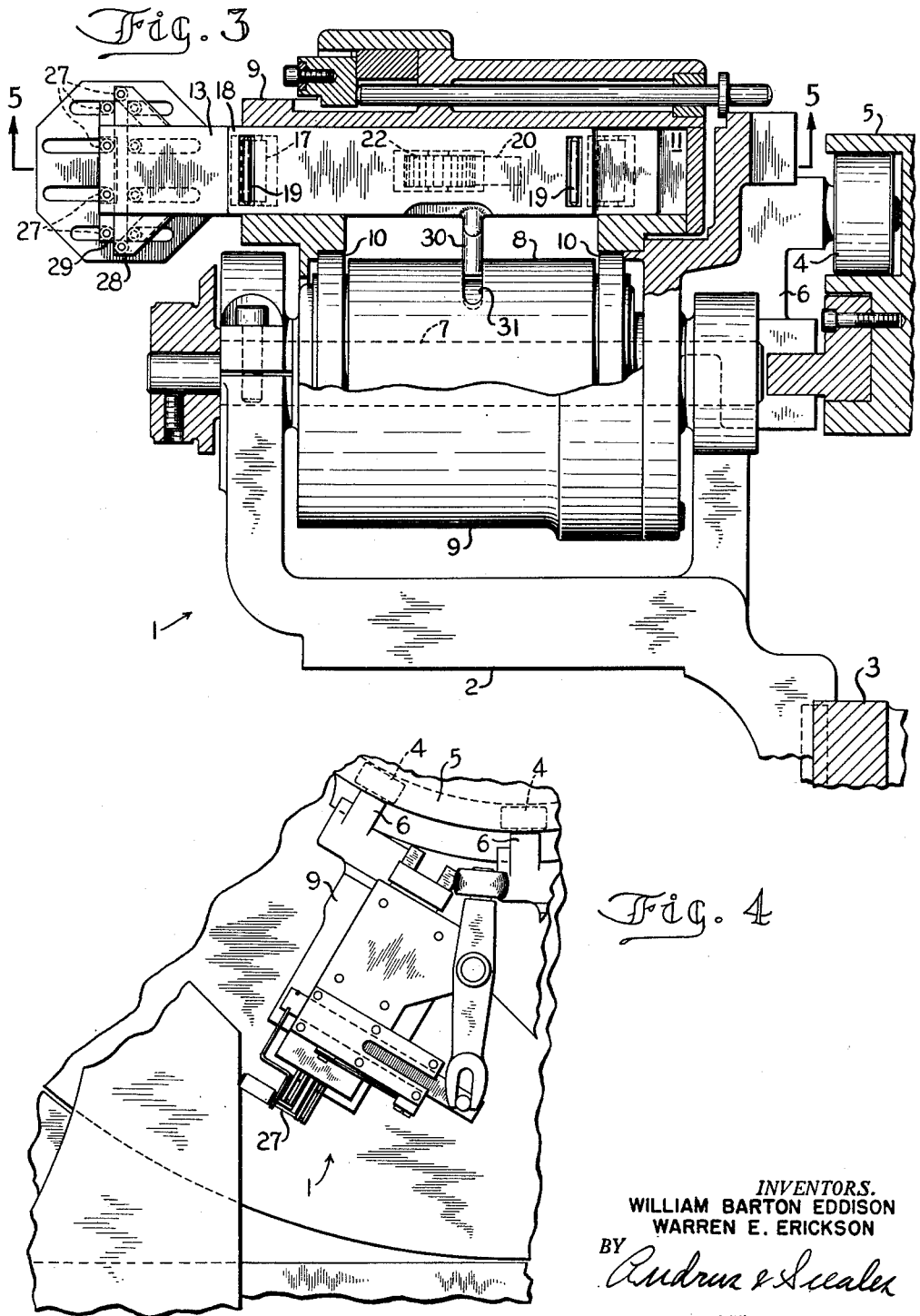

Dec. 10, 1957 W. B. EDDISON ET AL 2,815,628
SEAL HANDLING HEAD
Filed May 31, 1956 3 Sheets-Sheet 3

INVENTORS.
WILLIAM BARTON EDDISON
WARREN E. ERICKSON
BY
*Attorneys*

United States Patent Office 2,815,628
Patented Dec. 10, 1957

2,815,628

SEAL HANDLING HEAD

William Barton Eddison, Ardsley-on-Hudson, N. Y., and Warren E. Erickson, Madison, Wis., assignors to Gisholt Machine Company, Madison, Wis., a corporation of Wisconsin Application May 31, 1956, Serial No. 588,495

6 Claims. (Cl. 53—291)

This invention relates to a seal handling head and more particularly to a seal opening and applying head for machines which apply sealing bands to bottle tops and the like.

The present invention is an improvement on the head described and claimed in the copending application of William Barton Eddison, one of the present applicants, Serial No. 410,194, filed February 15, 1954.

As disclosed in the above-identified application, such heads are adapted to pick a tubular seal off from a two finger head, to open the seals to a substantially cylindrical shape and turn the axis thereof to a vertical direction, and then to apply the seal downwardly upon a bottle top indexed therewith.

The Eddison application, referred to above, disclosed the use of a plurality of cam grooves disposed in a cylindrical cam body which determined the path of movement of suitable cam followers for opening and closing the fingers.

In some instances, as where relatively large seals are to be applied, it is necessary to provide a relatively greater shifting of the fingers between the open and closed position. This necessitates a greater axial displacement of each cam groove on the cam body. If a plurality of such cam grooves were utilized, the length of the cam body and the head would have to be increased, which is not desirable.

The present invention overcomes the above difficulty by providing a seal handling head which utilizes only a single cam groove in the cylindrical cam body. The tongue which rides in the cam groove serves to shift one slide to which seal opening fingers are attached. Shifting of the one driving slide serves to shift other driven slides and fingers in the head, in a manner to be described.

The accompanying drawings illustrate the best mode presently contemplated by the inventors for carrying out the invention.

In the drawings:

Fig. 3 is a vertical section of the head with the latter in pickup position 90° from the head of Fig. 2 and taken on line 3—3 of Fig. 2;

Fig. 4 is a reduced plan view of the head in the position shown in Fig. 3 just after the seal has been picked up by the fingers;

Figure 1:
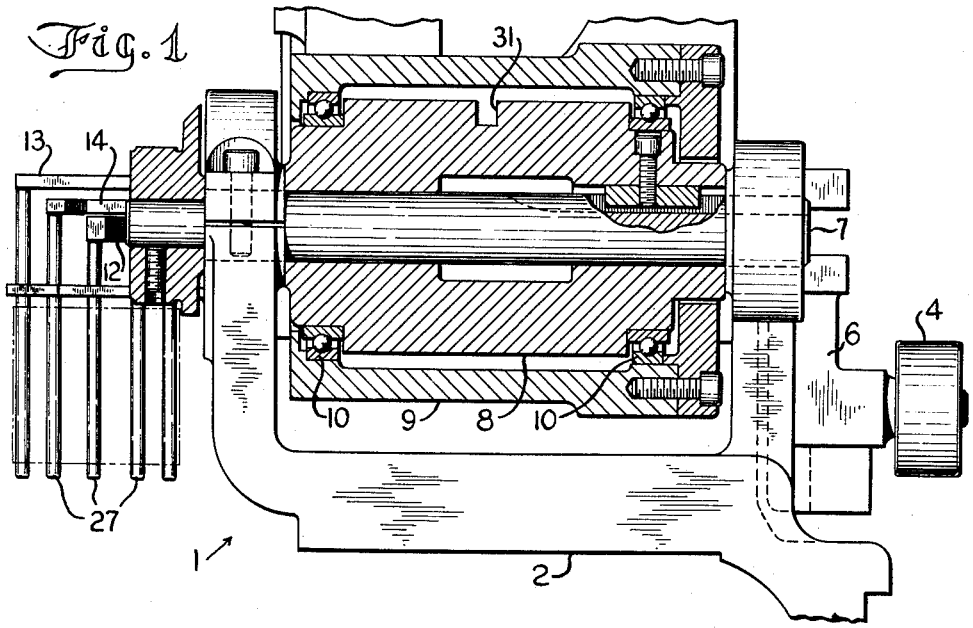
Figure 1 is a vertical axial section of a seal handling head constructed in accordance with the invention.

As shown in the drawings, the seal handling head 1 is mounted on a bracket 2 which in turn is carried by a rotary member 3, the latter being shown only fragmentarily in the drawings and described in more detail in the above-mentioned copending application.

Head 1 carries a cam follower 4 which is adapted to engage a fixed cam 5 disposed adjacent rotary member 3 and adjacent the path of the head. Follower 4 is disposed at the end of a crank 6, and is adapted to turn head 1 through 90° to present a seal in vertical alignment with a bottle top.

Each bracket 2 is shaped like a clevis with two upstanding spaced arms carrying a horizontal shaft 7 adapted to be fixed in selected adjustable rotational position. Shaft 7 carries a generally cylindrical cam body 8 which is keyed to the shaft to secure the cam body in adjusted rotational position.

The housing 9 for head 1 is mounted for rotation on cam body 8 by means of antifriction ball bearings 10, the cages of which are disposed concentric with shaft 7, one at each end of the cam body. Housing 9 has a slide chamber 11 above cam body 8 and extending parallel thereto with the side of the chamber toward the cam body open to accommodate cam actuation described hereinafter.

Chamber 11 is generally rectangular in section and contains a stationary plate 12 and four movable plates 13, 14, 15 and 16. Stationary plate 12 is rigidly secured between the walls of chamber 11 in housing 9 and separates a pair of upper slide plates 13 and 14 from a pair of lower slide plates 15 and 16.

A pair of spaced roller bearings 17 are disposed within transverse slots in stationary plate 12 and are adapted to bear against the adjacent slide plates 14 and 15 and allow sliding movement thereof with a minimum of friction. The slide plates 13, 14, 15 and 16 are spaced apart from each other and from the walls of chamber 11 with spacer plates 18 disposed therebetween. Each plate 18 carries a pair of transverse needle rollers 19 near each end adapted to bear against the adjacent slide plates and chamber walls, as the case may be, to allow sliding movement of plates 13, 14, 15 and 16 with a minimum of friction.

Outermost slide plates 13 and 16 are provided with a gear rack 20 and 21 respectively, disposed centrally on the inner surface thereof. A pinion gear 22 is mounted in a longitudinal slot in stationary plate 12 and adapted to engage racks 20 and 21. Gear 22 passes through spacer plates 18 and through a longitudinal slot disposed in slide plate 14 and in slide plate 15.

Another longitudinal slot is disposed in plate 14 and is adapted to receive a drive pin 23 which is secured to uppermost slide plate 13 and extends downwardly therefrom into the slot. The ends of the slot provide a pair of stops 24 which are engaged by drive pin 23 during operation of the head in a manner to be described. A second slot is also disposed in plate 15 and is adapted to receive a drive pin 25 which is secured to lowermost slide plate 16 and extends upwardly therefrom into the slot. A pair of stops 26, similar to stops 24, are provided in the slot and are engaged by drive pin 25 during operation of the head in a manner to be described.

Plates 12 through 16, inclusive, extend outwardly from one end of chamber 11 free of housing 9 and rigidly carry seal engaging fingers 27 for the head. For this purpose each plate carries two fingers, one at each side of the plate at the outer end thereof. Stationary plate 12 has large side lugs 28 for carrying the corresponding fingers 27 so that they are spaced apart a substantial distance. Slide plates 14 and 15 also have side lugs 29, but their lugs are of such a size that the corresponding fingers 27 mounted thereon are spaced apart a lesser distance than the fingers on lugs 28. The outermost slide plates 13 and 16 have the corresponding fingers 27 carried directly thereon and laterally spaced apart and adjacent the longitudinal center line of their corresponding plates.

Figure 5:
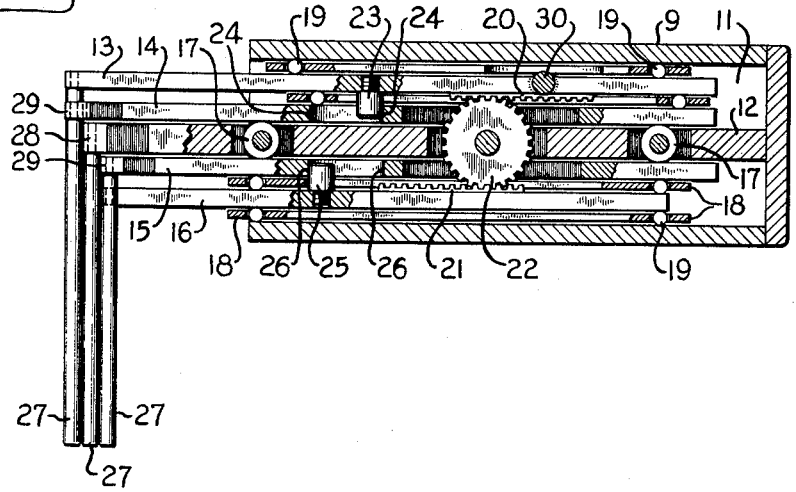
Fig. 5 is a detail section of the finger plates and carrier with the fingers closed.

When fingers 27 are closed together, as shown in Figs. 3 and 5, the slide plate fingers form four laterally spaced pairs of fingers, and the stationary plate fingers are disposed laterally outwardly of the others and on a transverse axis running between the pairs.

Figure 2:
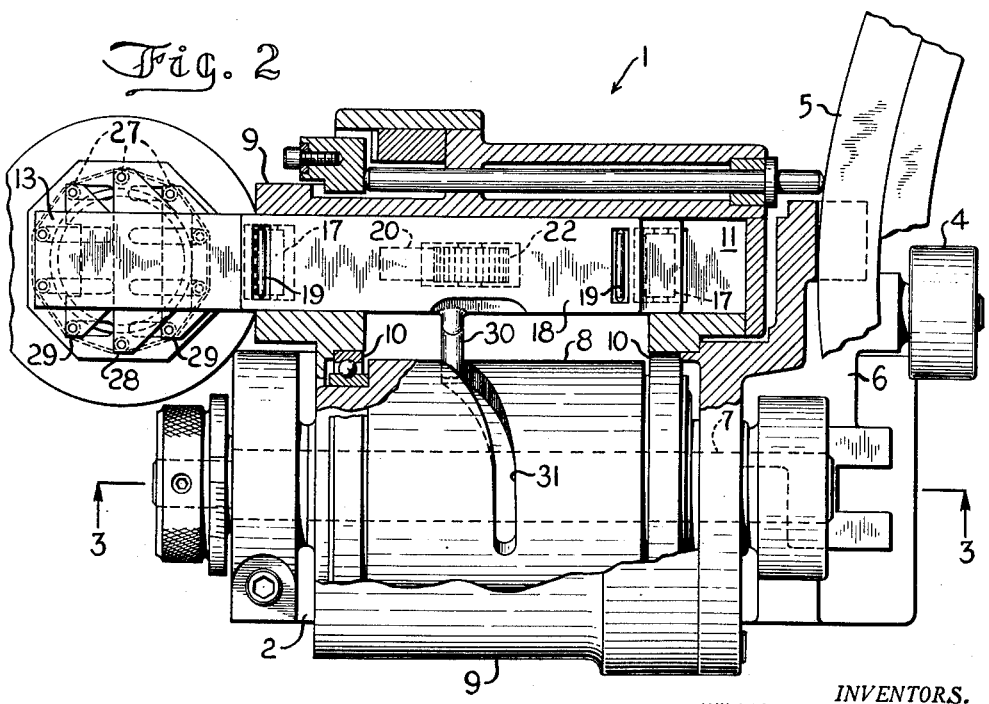
Fig. 2 is a horizontal axial section of the head.
Figure 6:
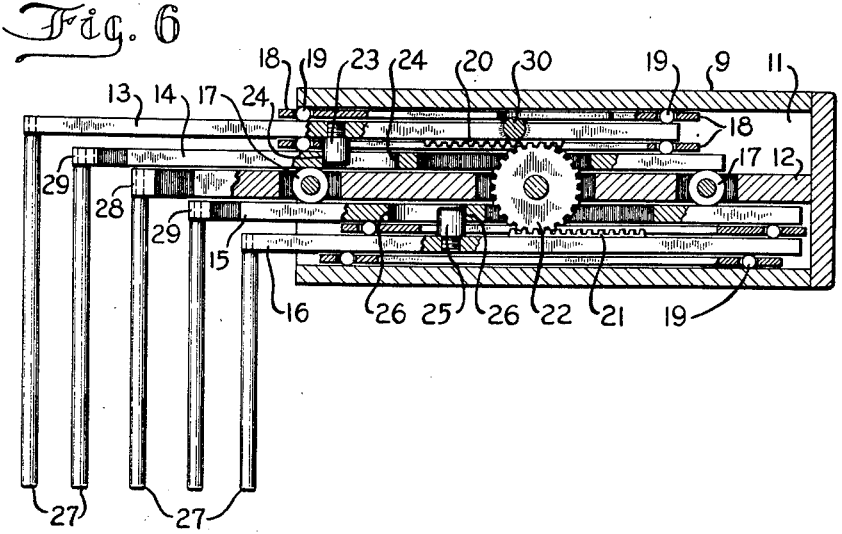
Fig. 6 is a view similar to Fig. 5 showing the fingers in the open position.

When fingers 27 are opened or separated, as shown in Figs. 2 and 6, they define the outer limits of a substantially cylindrical shape suitable in applying seals to bottles or the like.

Upper slide plate 13 carries a pin or tongue 30 which extends into a single cam groove 31 disposed in the outer circumference of cam body 8. Groove 31 is curved so that rotation of house 9 through 90° relative to cam body 8 will effect a longitudinal shifting of slide plate 13.

If the fingers 27 are closed, as shown in Fig. 5, rotation of housing 9 will cause driving slide plate 13 and its corresponding fingers to move outwardly away from the head 1. This movement will drive pinion gear 22 on rack 20, and gear 22 will in turn drive lower driven slide plate 16 through rack 21. The movement of plate 16 and its corresponding fingers will, however, be toward head 1, a distance corresponding to the distance traveled away from the head by plate 13.

As plate 13 moves away from the head, upper drive pin 23 will engage the outer stop 24 disposed in the slot in driven slide plate 14. Continued movement of plate 13 will shift plate 14 away from head 1. Outer stop 24 is so disposed that plate 13 will have traveled a little more than one-half its total possible traveling distance before the outer stop 24 is engaged, so that at the end of the stroke the fingers attached to plate 14 will be positioned approximately on the arc of a circle passing through the fingers attached to plates 12 and 13.

Similarly, as plate 16 moves toward head 1, lower drive pin 25 will engage the inner stop 26 disposed in the slot in driven slide plate 15. Continued movement of plate 16 will shift plate 15 and move the latter's fingers 27 toward the head. Inner stop 26 is disposed so that plate 16 will have traveled a little more than one-half its total possible distance before the stop is engaged, so that at the end of the stroke the fingers attached to plate 15 will be positioned approximately on the arc of a circle passing through the fingers attached to plates 12 and 16.

The extended position of the fingers, together with their corresponding plates and the drive pins and stops is best shown in Fig. 6. Plate 12 and its corresponding fingers 27 do not shift, but provide a point of reference for the other plates and fingers.

After application of a seal to a bottle top, housing 9 is again rotated through 90° to close the fingers. Tongue 30 follows cam groove 31 so that the uppermost slide plate 13 shifts back toward head 1 until its fingers are adjacent the fingers of plate 12. Return of plate 13 rotates pinion gear 22 in a direction opposite to that when the fingers are being expanded. This causes an outward movement of plate 16. After traveling a predetermined distance, drive pins 23 and 25 engage inner and outer stops 24 and 26, respectively, which cause plates 14 and 15 to move so that their corresponding fingers approach the fingers of plate 12.

After retraction of fingers 27, head 1 is again ready to pick up a new seal for application to a bottle top.

Roller bearings 17 and needle rollers 19 in spacer plates 18 allow movement of the slide plates with a minimum of friction and wear.

The invention contemplates a novel head which utilizes only a single cam groove for actuation and limitation of movement of a plurality of fingers. Relatively large or small finger displacements may be provided without the need for changing the size of the head. Cam bodies providing a large range of possible finger displacements are interchangeable.

The ten finger head shown and described herein, has been found suitable for applying seals of relatively large diameters. Heads having other numbers of fingers may be utilized without departing from the spirit of the invention.

Various modes of carrying out the invention are contemplated as being within the scope of the following claims particularly pointing out and distinctly claiming the subject matter which is regarded as the invention.

We claim:

1. In a seal opening and applying head, a rotatable member with a plurality of slides carried by said member and having seal carrying means on said slides; means disposed to actuate at least two of said slides in response to the rotational movement of said member, said means comprising a cam body adjacent to said member and having a cam surface thereon, a cam follower secured to one of said slides and adapted to follow said cam surface to actuate the slide upon rotation of said member, and means responsive to actuation of said slide to actuate at least one other slide to expand or contract the seal carrying means during handling of seals thereby.

2. In a seal opening and applying head, a rotatable member, a driving slide and at least one driven slide carried by said member, seal carrying fingers disposed on the slides, a cam body adjacent to said member and having a cam surface thereon, a cam follower secured to said driving slide and adapted to follow said cam surfaces to actuate the driving slide upon rotation of said member, and means responsive to actuation of said driving slide to actuate at least one driven slide to expand or contract the fingers during handling of seals thereby.

3. In a seal opening and applying head, a rotatable member, a driving slide and at least one driven slide carried my said member, seal carrying fingers disposed on the slides, a cam body adjacent to said member and having a cam surface thereon, a cam follower secured to said driving slide and adapted to follow said cam surface to actuate the driving slide upon rotation of said member, and means responsive to actuation of said driving slide to actuate at least one driven slide to expand and contract the fingers during handling of seals thereby; said means comprising a rack disposed on said driving slide, a second rack disposed on at least one driven slide, and a pinion gear disposed between said racks and engaged therewith, actuation of said driving slide in one direction serving to drive said driven slide through the pinion gear in the opposite direction.

4. In a seal opening and applying head, a rotatable member, a driving slide and at least one driven slide carried by said member, seal carrying fingers disposed on the slides, a cam body adjacent to said member and having a cam surface thereon, a cam follower secured to said driving slide and adapted to follow said cam surface to actuate the driving slide upon rotation of said member, and means responsive to actuation of said driving slide to actuate at least one driven slide to expand and contract the fingers during handling of seals thereby; said means comprising a pin disposed in said driving slide and extending outwardly therefrom and adapted to be slidably received by a slot in a driven slide, and spaced stop means disposed on either side of said pin in said slot, actuation of said driving slide in one direction causing engagement of one of the stop means by said pin to drive the driven slide in the same direction.

5. In a seal opening and applying head, a rotatable member, a driving slide and a plurality of driven slides carried by said member, seal carrying fingers disposed on the slides, a cam body adjacent to said member and having a cam surface thereon, a cam follower secured to said driving slide and adapted to follow said cam surface to actuate the driving slide upon rotation of said member, and means responsive to actuation of said driving slide to actuate said driven slides to expand and contract the fingers during handling of seals thereby; said means comprising a rack disposed on said driving slide, a second rack disposed on one of the driven slides, a pinion gear disposed between said racks and in engagement therewith, actuation of said driving slide in one direction serving to drive said last named driven slide through the pinion gear in the opposite direction, a pin disposed in said driving slide and extending therefrom and adapted to be received by a slot in another driven slide, and spaced stop means disposed on both sides of said pin in said slot, actuation of said driving slide in one direction causing engagement of one of the stop means by said pin to drive said last named driven slide in the same direction.

6. In a seal opening and applying head, a rotatable member, a cam body adjacent to said member and having a cam surface thereon, a driving slide carried by said member, a cam follower secured to said driving slide and adapted to follow said cam surface to actuate the driving slide upon rotation of said member, a first driven slide carried by said member and spaced from said driving slide, a rack disposed on said driving slide, a second rack disposed on said first driven slide, a pinion gear disposed between said racks and in engagement therewith, actuation of said driving slide in one direction serving to drive said first driven slide through the pinion gear in the opposite direction, a second driven slide carried by said member and spaced from said driving slide and having a slot therein, a pin carried by the driving slide and extending therefrom into said slot, spaced stop means disposed on both sides of said pin in said slot, actuation of said driving slide in one direction causing engagement of one of the stop means by said pin to drive said second driven slide in the same direction, a third driven slide carried by said member and spaced from said driving slide and having a slot therein, a pin disposed in said first driven slide and extending therefrom into said last named slot, and spaced stop means disposed on both sides of said last named pin in said last named slot, actuation of said first driven slide in one direction causing engagement of one of said last named stop means by said last named pin to driven said third driven slide in the same direction.

<p style="text-align:center">No references cited.</p>